(12) United States Patent
Caradec et al.

(10) Patent No.: US 8,689,928 B2
(45) Date of Patent: Apr. 8, 2014

(54) TRUCK-MOUNTED VIBRATORY SOURCE AND METHOD

(71) Applicant: Sercel, Carquefou (FR)

(72) Inventors: Gilles Caradec, Cazere (FR); Pascal Buttin, Clarac (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 13/686,983

(22) Filed: Nov. 28, 2012

(65) Prior Publication Data

US 2013/0140106 A1 Jun. 6, 2013

(30) Foreign Application Priority Data

Dec. 2, 2011 (EP) ..................................... 11306608

(51) Int. Cl.
*G01V 1/04* (2006.01)
(52) U.S. Cl.
USPC ........................................................... 181/114
(58) Field of Classification Search
USPC ........................................................... 181/114
See application file for complete search history.

(56) References Cited

U.S. PATENT DOCUMENTS

| | | | | |
|---|---|---|---|---|
| 3,374,853 A | * | 3/1968 | Kilmer | 181/114 |
| 3,789,951 A | * | 2/1974 | Silverman | 181/114 |
| 4,011,923 A | * | 3/1977 | Talke et al. | 181/114 |
| 4,050,540 A | * | 9/1977 | Cholet et al. | 181/114 |
| 4,484,656 A | * | 11/1984 | Bird | 181/114 |
| 4,715,471 A | * | 12/1987 | Fulkerson et al. | 181/121 |
| 5,396,029 A | * | 3/1995 | Talke | 181/114 |
| 5,554,829 A | * | 9/1996 | Jaworski | 181/114 |
| 2005/0252711 A1 | | 11/2005 | Rau | |
| 2010/0000819 A1 | | 1/2010 | Cannell et al. | |

FOREIGN PATENT DOCUMENTS

JP 2007285027 A 11/2007
WO 2004063771 A1 7/2004

OTHER PUBLICATIONS

European Search Report issued in related application No. EP 11 30 6608 and mailed on Apr. 12, 2012.
European first Official Letter dated Jul. 25, 2013 in related European Application No. 11 306 608.8.

* cited by examiner

*Primary Examiner* — Forrest M Phillips
(74) *Attorney, Agent, or Firm* — Patent Portfolio Builders PLLC

(57) ABSTRACT

Method and land-based system for generating seismic signals. The system includes a vehicle configured to move to a desired location above ground, the vehicle having a first end and a second end, opposite to the first end; a vibratory source configured to generate seismic waves into the ground; a lifting system connecting the first end of the vehicle to the vibratory source and configured to lift or lower the vibratory source relative to the ground; and a balancing device connected to the second end of the vehicle and configured to lift the second end of the vehicle from the ground.

20 Claims, 10 Drawing Sheets

TRUCK-MOUNTED VIBRATORY SOURCE AND METHOD

BACKGROUND

1. Technical Field

Embodiments of the subject matter disclosed herein generally relate to methods and systems and, more particularly, to mechanisms and techniques for distributing a weight on a truck-mounted vibratory source.

2. Discussion of the Background

Seismic data acquisition and processing generate a profile (image) of subterranean geophysical structures. While this profile does not provide an accurate location of oil and gas reservoirs, it suggests, to those trained in the field, the presence or absence of these reservoirs. Thus, providing a high-resolution image of the geophysical structures is an ongoing process.

To obtain a high-resolution image of the underground, a seismic survey system employs a seismic source that generates seismic waves, and seismic receivers that record seismic signals associated with the seismic waves. The seismic source imparts energy to the ground. The energy travels through the subsurface and gets reflected from certain subsurface geological formations, e.g., boundaries or layers. The reflected energy travels back to the surface, where the seismic receivers record it. The recorded data is processed to yield information about the location and physical properties of the layers making up the subsurface.

For land explorations, the seismic source may be a vibratory source. A vibratory source may be mounted on a truck and is capable of injecting low-frequency vibrations into the earth by having one part in contact with the earth and oscillating. The energy transmitted by the vibratory source to the ground is proportional with weight acting on it. For land seismic surveys, it is desirable to transmit as much energy as possible to the ground. Thus, the heavier the truck is, the larger the energy transmitted to the ground by the vibratory source.

Geophysical exploration companies install the vibratory sources on buggies for uneven fields or on trucks when road transits are required. Standard vibratory source configurations include power vibratory sources installed on a buggy (or truck). The vibratory sources may be divided into high-, medium- and low-energy sources. High-energy vibratory sources have a weight larger than 10 tons (t). The high-energy vibratory sources are usually installed in the middle of the carrier. Additional weights are used to balance the carrier when using the vibratory source. The additional weights are used to position the center of gravity of the source-vehicle assembly above the vibratory source.

Medium-energy vibratory sources have a weight of around 7 t and the light-energy vibratory sources have a weight of around 3 t. These sources are traditionally mounted at the back of the vehicle. The vehicles carrying medium- and light-energy vibratory sources do not typically need to be balanced with additional weight.

An example of a medium-energy vibratory source and accompanying truck is shown in FIG. 1. This system 10 includes the truck 12 on which the source 14 is provided. The source 14 is attached through a hydraulic cylinder 16 to the truck 12. The hydraulic cylinder 16 is typically attached to the back of the truck, between the frame of the truck and the source. Thus, when the source needs to be taken to a desired location, the hydraulic cylinder lifts the source so it does not touch the ground and the truck can move to the desired location. Once at the desired location, the hydraulic cylinder lowers the source to touch the ground and applies part of the weight of the truck on the source. At this point, the source is ready to efficiently impart energy to the ground.

However, a problem with existing vehicles that carry, either at the back or at the front, a vibratory source is that the percentage of the vehicle weight applied to the source is limited by the design of the vehicle. In addition, an additional weight that is applied on the front wheels (when the source is attached to the back of the truck) when the source contacts the ground and the back wheels are off-ground requires that the front wheels and associated parts be oversized, which is undesirable.

This problem is illustrated with the following example. Assume that for the system shown in FIG. 1, the truck wheelbase length is about 3 m, the distance from the vibratory source to the rear wheels axle is about 1.5 m, the gross weight of the vehicle (including the source) is about 15 t and the distance from the center of gravity of the system, when the source is up, to the front wheels axle is about 1.5 m. Using basic physics, i.e., the sum of total forces on the Y axis should be zero and the sum of the total torque produced by these forces is also zero, the following results are obtained. When the source is up, the weight on the front wheels is about 7.5 t and the weight on the back wheels is about 7.5 t. When the source is lowered to contact the ground so that the back wheels are completely off the ground, the weight on the front wheels is about 10 t, the weight on the back wheels is zero and the weight on the vibratory source is about 5 t.

Thus, it can be seen from this example that for achieving a weight of 5 t on the vibratory source, the front wheels need to be designed to support 10 t. It would be advantageous to find a solution to apply less weight on the front wheels and more weight on the vibratory source. Therefore, there is a need in the industry to provide a simple, reliable and cost-effective system of distributing more weight on the vibratory source and less weight on the wheels.

SUMMARY

According to an exemplary embodiment, there is a land-based system for generating seismic signals. The system includes a vehicle configured to move to a desired location above ground, the vehicle having a first end and a second end, opposite to the first end; a vibratory source configured to generate seismic waves into the ground; a lifting system connecting the first end of the vehicle to the vibratory source and configured to lift or lower the vibratory source relative to the ground; and a balancing device connected to the second end of the vehicle and configured to lift the second end of the vehicle from the ground.

According to another exemplary embodiment, there is a land-based system for generating seismic signals. The system includes a vehicle configured to move to a desired location above ground, the vehicle having a first end and a second end, opposite to the first end; a vibratory source configured to generate seismic waves into the ground; a lifting system connecting the first end of the vehicle to the vibratory source and configured to lift and lower the vibratory source relative to the ground; and a balancing device connected to the second end of the vehicle and configured to lift the second end of the vehicle from the ground so that the weight of the system is shifted onto the vibratory source.

According to still another exemplary embodiment, there is a land-based system for generating seismic signals. The system includes a truck configured to move to a desired location above ground, the vehicle having a back end and a front end, opposite to the back end; a vibratory source configured to generate seismic waves into the ground; a lifting system connecting the back end of the truck to the vibratory source and configured to lift and lower the vibratory source relative to the ground; and two telescopic legs connected to the front end of the truck and configured to lift the front end of the truck from the ground.

According to yet another exemplary embodiment, there is a method for positioning a vehicle with a vibratory source and for generating seismic waves. The method includes a step of parking the vehicle at a desired location; a step of lowering a vibratory source to contact the ground and to lift off the ground wheels proximate to the vibratory source; a step of lowering telescopic legs to lift off the ground wheels proximate to the telescopic legs and to distribute more weight on the vibratory source; and a step of actuating the vibratory source to generate the seismic waves into the ground.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a medium-energy vibratory source mounted on the back of a truck or buggy. However, the embodiments to be discussed next are not limited to this system, but may be applied to front-mounted sources and/or to high- or low-energy vibratory sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a novel system that includes a vehicle and a vibratory source. The vibratory source may be mounted at the back or front of the vehicle. Either way, a balancing system is attached to the truck, opposite the location of the vibratory source. The balancing system is configured to reduce the weight applied on the wheels distal from the source, when the source is down, and also to distribute more vehicle weight on the source. Also, the novel system is configured to include a load controller that can adjust a load distribution on the wheels. For example, the load controller may configure the balancing system and/or the vibratory source to reduce a load on any of the wheels. In another application, the load controller may instruct the balancing system and/or the vibratory source to remove any weight exerted on the back and/or front wheels. This and similar systems are now discussed in more detail.

Figure 2:
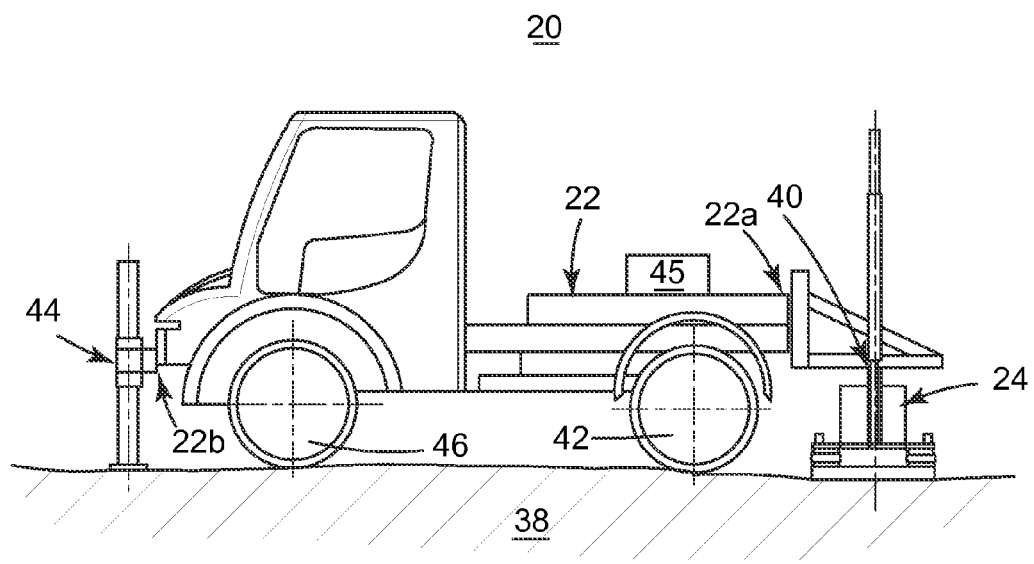
FIG. 2 is a schematic diagram of a truck-mounted vibratory source and its corresponding truck having support legs according to an exemplary embodiment.

According to an exemplary embodiment illustrated in FIG. 2, a system 20 includes a vehicle 22 and a vibratory source 24. The vehicle has a first end 22a and a second end 22b opposite the first end 22a. The vehicle may be a truck or a buggy that, for example, has no propelling means. The vibratory source 24 is attached to the first end 22a of the vehicle, i.e., at the back of the vehicle in the figure. As noted above, the novel features discussed herein also apply to a source attached to the front of the vehicle.

Figure 3:
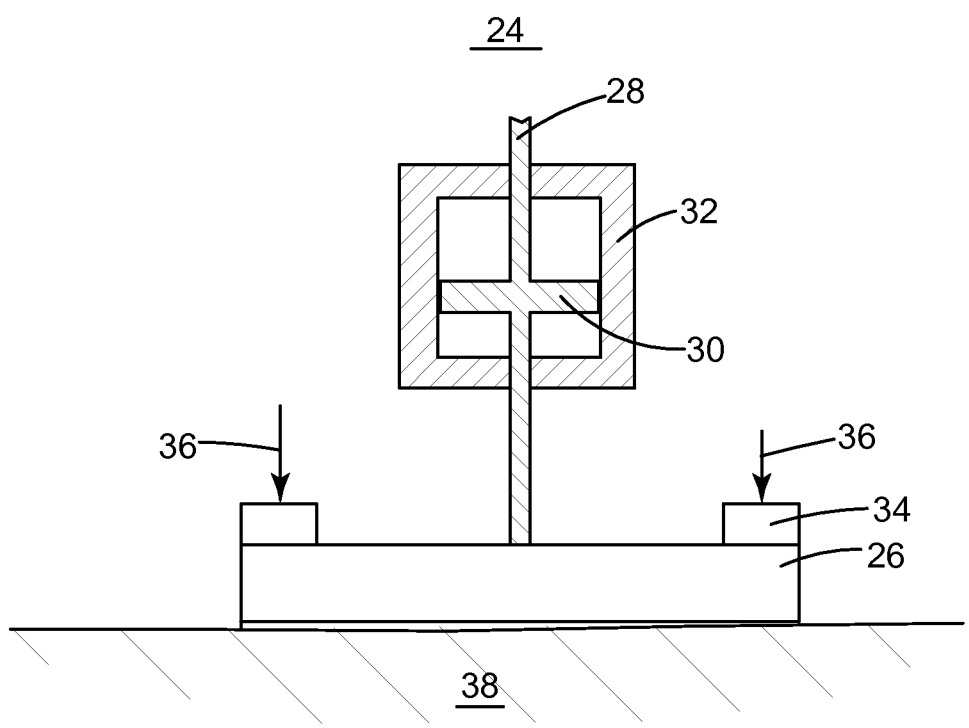
FIG. 3 is a schematic diagram of a vibratory source.

An example of a vibratory source 24 is shown in FIG. 3. The source 24 may include a base plate 26 that connects to a rod 28. The rod 28 includes a piston 30 inside a reaction mass 32. Insulation devices 34 may be provided on the base plate 26 to transmit the weight 36 of the vehicle 22 to the base plate 26. The base plate 26 is shown in FIG. 3 lying on the ground 38. The force transmitted to the ground is equal to the mass of the base plate times its acceleration, plus the weight of the reaction mass times its acceleration. The weight of the vehicle prevents the base plate from losing contact with the ground. Many designs for the vibratory source exist on the market, and any one of them may be used with the novel features discussed herein.

Returning to FIG. 2, the source 24 may be attached to the vehicle 22 through one or more lifting devices 40. An example of a lifting device 40 is a hydraulic cylinder. However, another example of a lifting device may use an electrical motor to move the source up and down. Other lifting devices may be used as will be appreciated by those skilled in the art. FIG. 2 shows the lifting device 40 in a down position, i.e., the source 24 is in contact with the ground 38. However, the lifting device 40 is not completely down because the back wheels 42 of the vehicle are not yet above ground in this figure.

FIG. 2 also shows a balancing device 44 attached to the second end 22b of the vehicle 22, i.e., opposite the source 24. The balancing device 44 may include one or more legs that can be deployed, when the vehicle is in position, to reduce the weight on the front wheels. The legs may be retracted to allow the vehicle to move and may be extended to touch the ground as shown in FIG. 2 to reduce the vehicle weight acting on the front wheels. The legs may be telescopic legs.

Vehicle 22 may also include load controllers 45 that are coupled to the balancing device 44 and the lifting device 40 of the source 24. The load controllers can adjust the load of each leg and, thus, the load remaining on the wheels. The load controllers are configured to provide a desired load acting on the vibratory source. The load controllers may also allow a small percentage of the gross vehicle weight to act on the wheels. In this respect, is it noted that the system 20 indicated in FIG. 2 may function when all the wheels are in contact with the ground, part of the wheels are in contact with the ground or no wheels are in contact with the ground. These situations are discussed later with regard to FIGS. 4 and 5.

Figure 4:
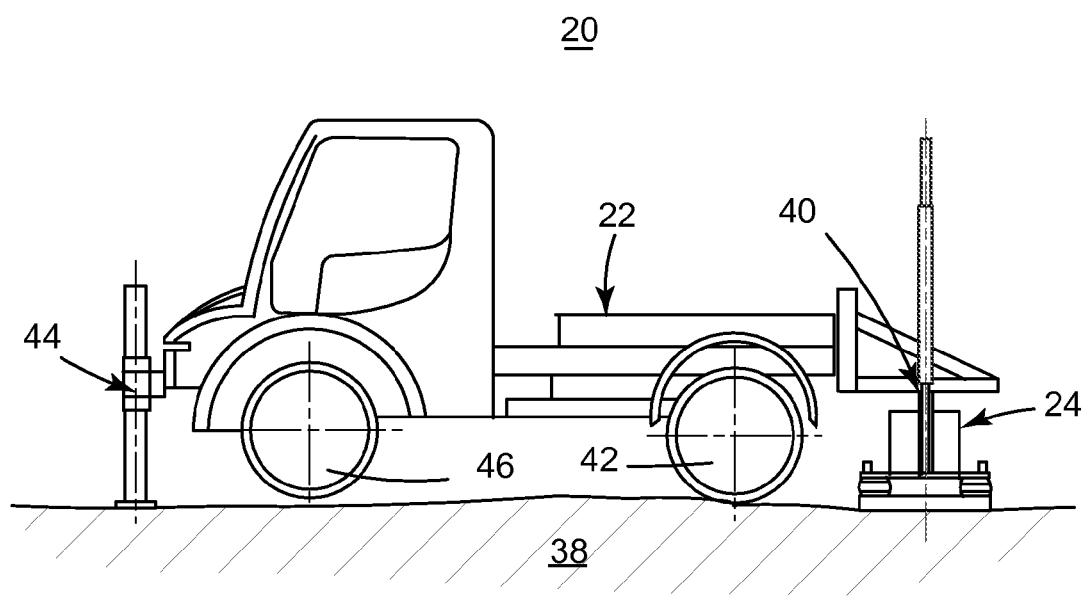
FIG. 4 is a schematic diagram of another truck-mounted vibratory source and its corresponding truck having support legs according to an exemplary embodiment.

While FIG. 2 shows the weight of the truck being shared by the balancing device 44 and the front wheels 46, FIG. 4 shows an embodiment in which the front wheels 46 are not touching the ground 38. However, in this embodiment, both the back wheels 42 and the source 24 are touching the ground 38, thus sharing some of the weight of the vehicle.

Figure 5:
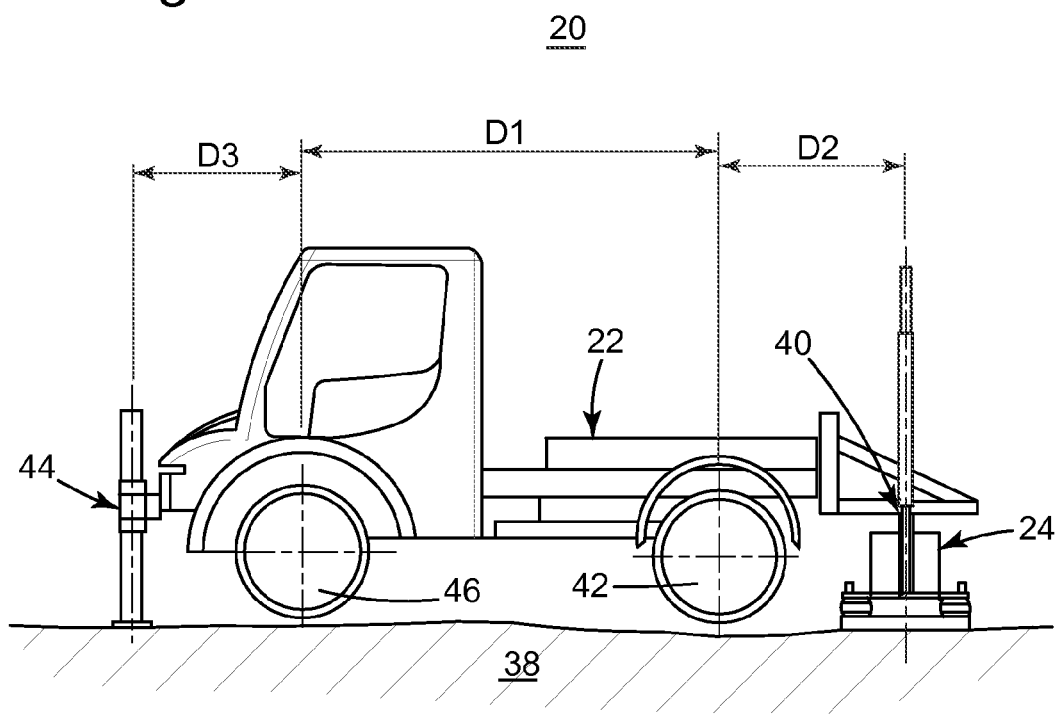
FIG. 5 is a schematic diagram of still another truck-mounted vibratory source and its corresponding truck having support legs according to an exemplary embodiment.

FIG. 5 shows another exemplary embodiment in which both the front and back wheels are off-ground and the entire weight of the vehicle is distributed between the balancing device 44 and the source 24. For this embodiment, the weight on the source is increased and the weight on the front wheels is reduced to zero. Thus, by implementing the balancing device 44, the wheels of the vehicle that carries the source do not have to be oversized in order to accommodate the extra weight when the source is down and the back wheels are up.

Figure 1:
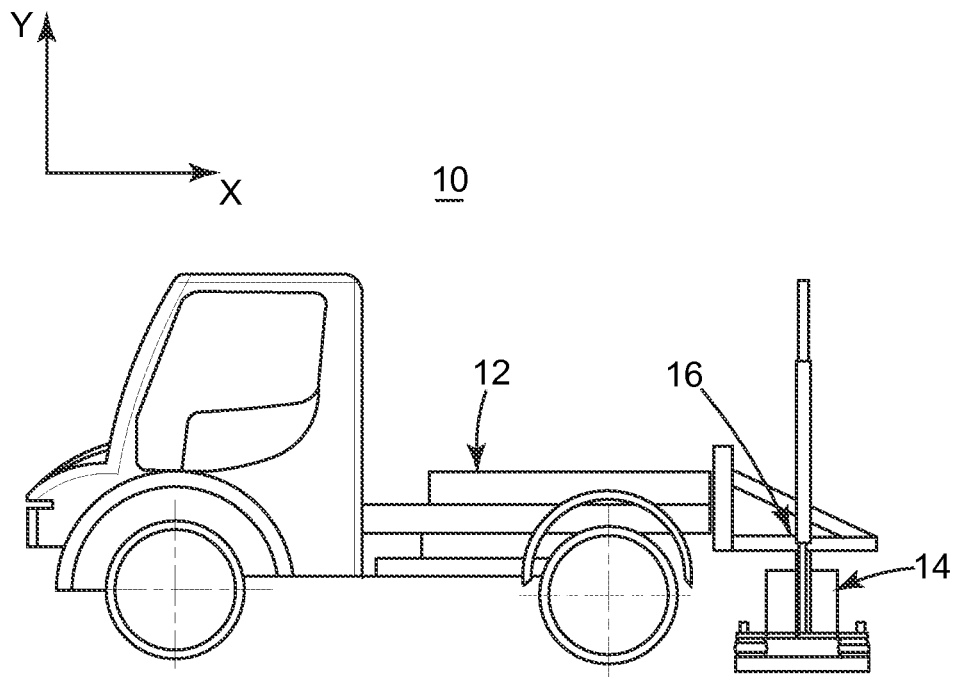
FIG. 1 is a schematic diagram of a truck-mounted vibratory source.

To illustrate an advantage of this novel system, the weight distribution on the wheels, source and balancing system is now calculated for the same case as that illustrated in FIG. 1. Thus, assume again that the wheelbase distance $D_1$ for the vehicle shown in FIG. 5 is around 3 m, the distance $D_2$ from the vibratory source 24 to the rear wheel axle is about 1.5 m, the distance $D_3$ from the balancing device 44 to the front wheels axle is about 1.5 m, the gross weight of the vehicle is about 16 t (one more ton than the example of FIG. 1 due to the extra weight added by the balancing device 44), and the distance from the center of gravity, with the source up, to the front wheels axle is about 1.30 m. After performing the calculations for the situation when the balancing device and the source are up, the weight on the front wheels is determined to be about 9 t and the weight on the back wheels is about 7 t. Of course, these numbers are illustrative and not intended to limit the applicability of the novel features.

However, when repeating these calculations for the case in which the front and back wheels are up, i.e., the balancing device 44 and the source 24 are down, it is found that the weight on the balancing device is 8.5 t and the weight on the vibratory source is about 7.5 t, with no weight on the back or front wheels. Thus, for this exemplary embodiment, the weight on the front wheels can be reduced to zero and the weight on the source is increased from 5 t to 7.5 t comparative to the example shown in FIG. 1. Therefore, if the intention is to obtain only 5 t on the source for a new vehicle, the vehicle may be made lighter than the one shown in FIG. 1.

Figure 6:
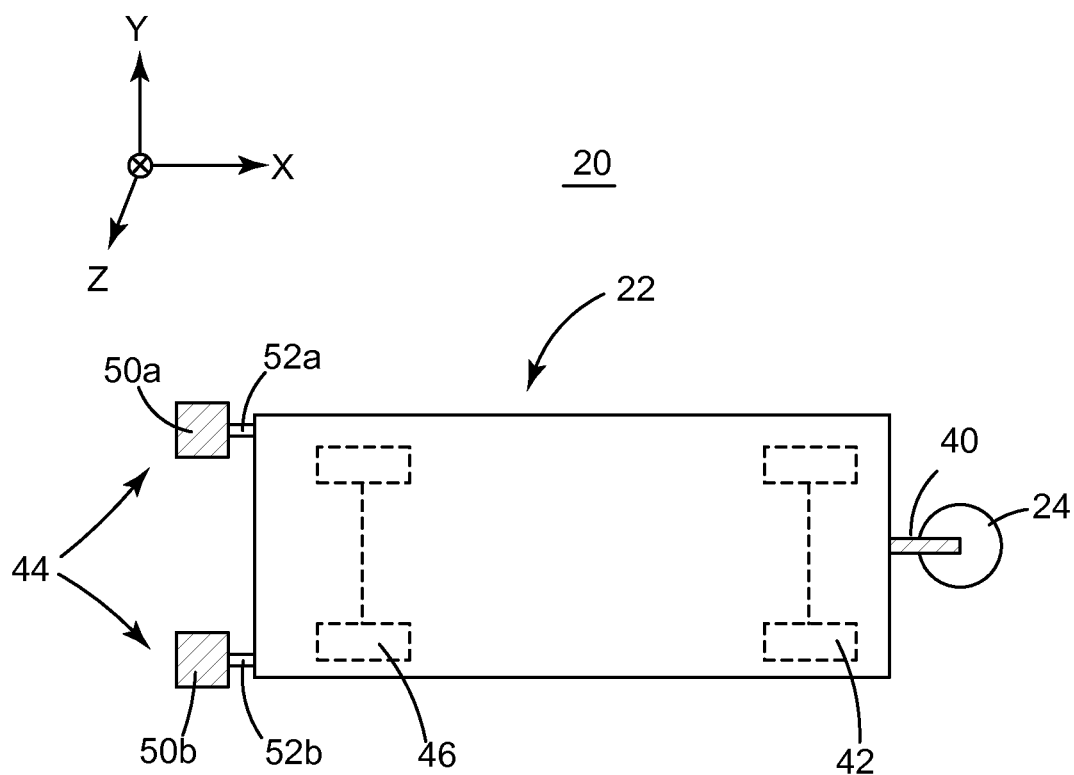
FIG. 6 is a schematic diagram of a truck-mounted vibratory source and its corresponding truck having support legs mounted on the front of the truck according to an exemplary embodiment.

According to another exemplary embodiment, the balancing device 44 may include two telescopic legs 50a-b as shown in FIG. 6. It is noted that telescopic legs is one possibility to implement legs that change their length. In one application the legs may articulated or retractable or rotatable, etc. Those skilled in the arts would know that other types of legs may be used and the telescopic legs mentioned herein are exemplary. FIG. 6 is a top view of the truck 22. The two telescopic legs 50a-b are located in front of the vehicle 22. The telescopic legs may be hydraulically or electrically activated. Thus, the legs may be extended toward the ground or retrieved from the ground (along Z axis in figure) as desired. In one application, there are telescopic arms 52a and 52b that connect the legs 50a and 50b, respectively, to the frame of the vehicle. In this application, the arms may be extended away or toward the vehicle, along a direction X. The legs may be used to also improve the stability of the vehicle.

Figure 7:
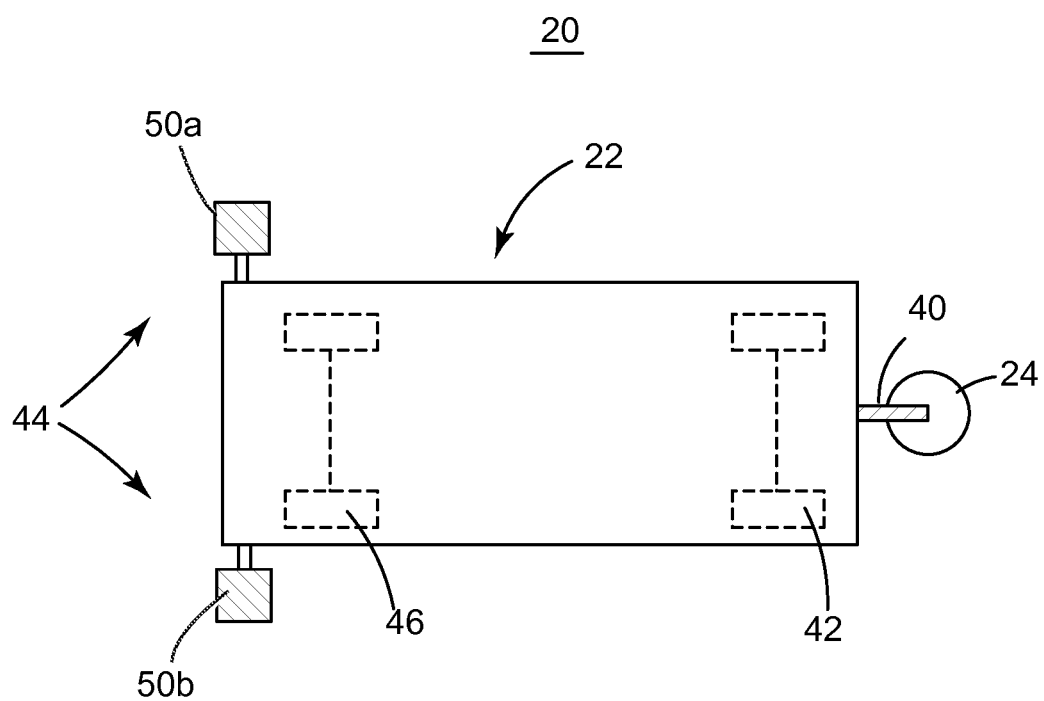
FIG. 7 is a schematic diagram of a truck-mounted vibratory source and its corresponding truck having support legs on the sides of the truck according to an exemplary embodiment.
Figure 8:
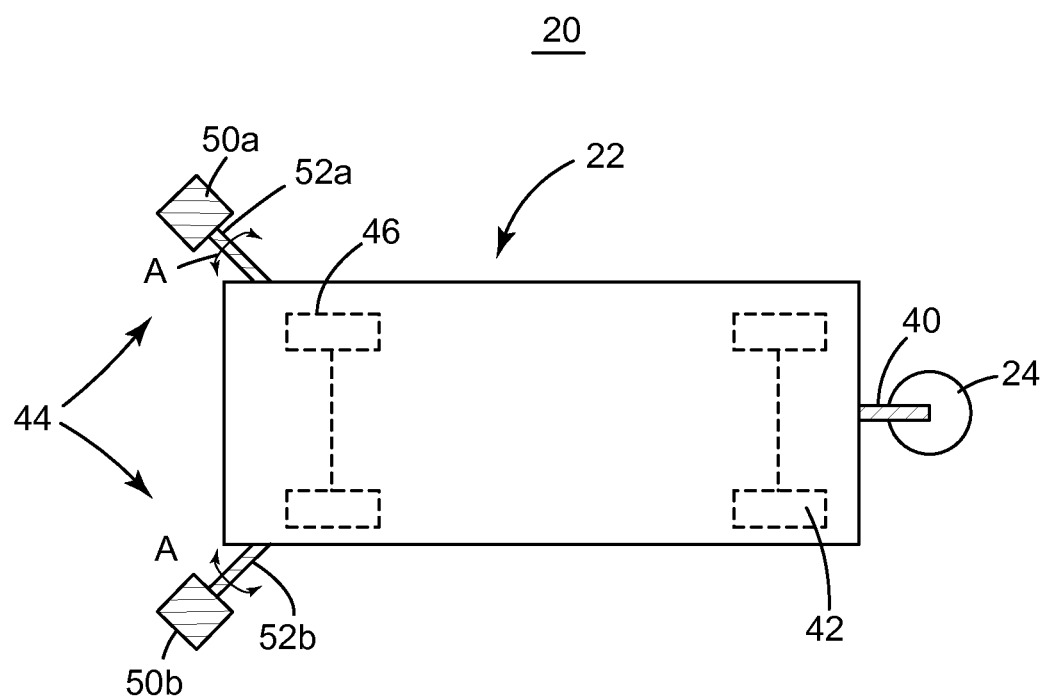
FIG. 8 is a schematic diagram of another truck-mounted vibratory source and its corresponding truck having swinging support legs according to an exemplary embodiment.
Figure 9:
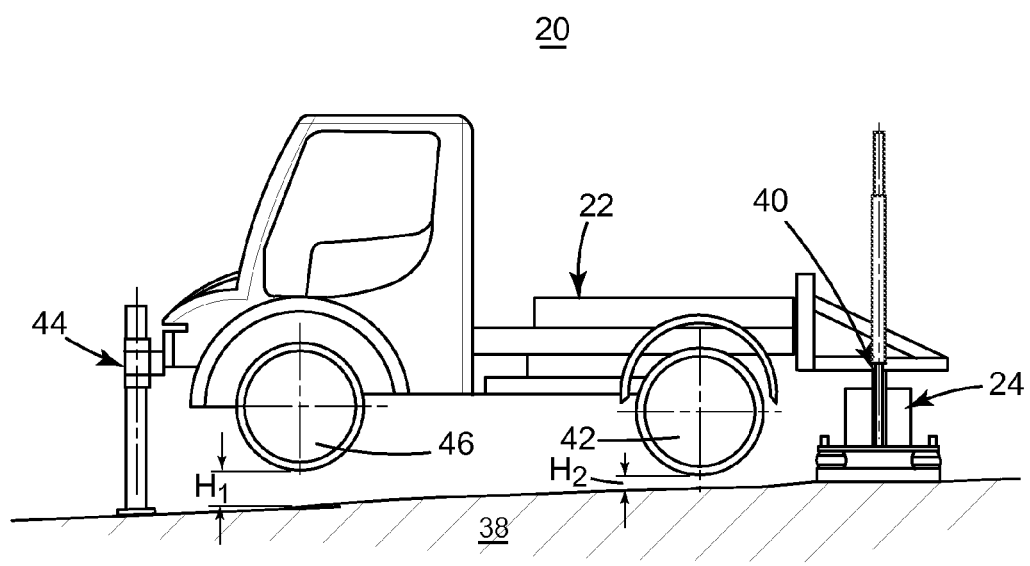
FIG. 9 is a schematic diagram of yet another truck-mounted vibratory source and its corresponding truck having support legs according to an exemplary embodiment.

In still another exemplary embodiment illustrated in FIG. 7, the legs 50a and 50b are mounted on the sides of the vehicle 22, preferably in front of the front wheels axle. In still another exemplary embodiment, the arms 52a-b may swing along a direction A as shown in FIG. 8. In yet another exemplary embodiment, the balancing device 44 may be used to raise the front wheels of the vehicle with a first height $H_1$ and the back wheels of the vehicle with a second height $H_2$, different from $H_1$, as shown in FIG. 9. In one application, $H_1$ is larger than $H_2$.

Figure 10:
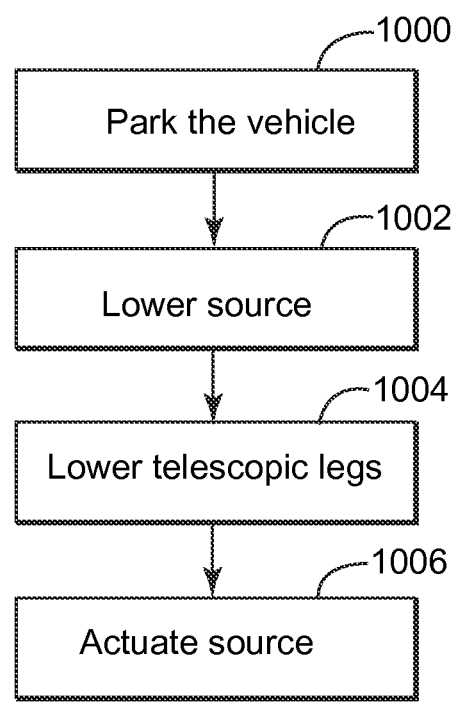
FIG. 10 is a flowchart of a method for positioning a vehicle with a vibratory source and for generating seismic waves according to an exemplary embodiment.

According to an exemplary embodiment, illustrated in FIG. 10, there is a method for imparting energy into the ground by using a system as shown in one of the previous embodiments. The method includes a step 1000 of parking the vehicle at a desired location, a step 1002 of lowering a vibratory source to contact the ground, a step 1004 of lowering telescopic legs, located opposite the vibratory source relative to a longitudinal direction of the vehicle, and a step 1006 of actuating the vibratory source to impart the seismic energy into the ground. In an optional step, the vibratory source is lowered so that wheels of the vehicle, proximate to the source, are off-ground. In still another optional step, the telescopic legs are lowered so that wheels of the vehicle, proximate to the legs, are off-ground. Thus, in one exemplary embodiment, all the wheels of the vehicle are off-ground.

The disclosed exemplary embodiments provide a system and a method for distributing more weight on a source attached to the vehicle. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A land-based system for generating seismic signals, the system comprising:
    a vehicle configured to move to a desired location above ground, the vehicle having a first end and a second end, opposite to the first end;
    a vibratory source configured to generate seismic waves into the ground;

a lifting system connecting the first end of the vehicle to the vibratory source and configured to lift or lower the vibratory source relative to the ground; and a balancing device connected to the second end of the vehicle and configured to lift the second end of the vehicle from the ground.

2. The system of claim 1, wherein the balancing device is configured to lift the second end of the vehicle until a first weight exerted on wheels associated with the second end is reduced or removed.

3. The system of claim 2, wherein the vibratory source is configured to lift the first end of the vehicle until a second weight exerted on wheels associated with the first end is reduced or cancelled or removed.

4. The system of claim 1, wherein the balancing device comprises:

two legs configured to extend and retract relative to the vehicle.

5. The system of claim 4, wherein the two legs are telescopic, are hydraulically activated and the vehicle has no other legs.

6. The system of claim 4, further comprising:

two arms connecting the vehicle to the two legs.

7. The system of claim 6, wherein the two arms are telescopic.

8. The system of claim 4, wherein the two legs are provided on sides of the vehicle.

9. The system of claim 8, wherein the two legs are configured to swing in a horizontal plane relative to the vehicle.

10. The system of claim 4, wherein the two legs are configured to lift the wheels proximate to the two legs more than the wheels proximal to the vibratory source to distribute more weight on the vibratory source.

11. A land-based system for generating seismic signals, the system comprising:

a vehicle configured to move to a desired location above ground, the vehicle having a first end and a second end, opposite to the first end;

a vibratory source configured to generate seismic waves into the ground;

a lifting system connecting the first end of the vehicle to the vibratory source and configured to lift and lower the vibratory source relative to the ground; and a balancing device connected to the second end of the vehicle and configured to lift the second end of the vehicle from the ground so that a weight of the system is shifted on the vibratory source.

12. A land-based system for generating seismic signals, the system comprising:

a truck configured to move to a desired location above ground, the vehicle having a back end and a front end, opposite to the back end;

a vibratory source configured to generate seismic waves into the ground;

a lifting system connecting the back end of the truck to the vibratory source and configured to lift and lower the vibratory source relative to the ground; and two telescopic legs connected to the front end of the truck and configured to lift the front end of the truck from the ground.

13. The system of claim 12, wherein the two legs are configured to lift the front end of the truck until a first weight exerted on front wheels is reduced or removed.

14. The system of claim 13, wherein the vibratory source is configured to lift the back end of the truck until a second weight exerted on back wheels is reduced or removed.

15. The system of claim 12, wherein the two telescopic legs are hydraulically activated and the truck has no other legs.

16. The system of claim 12, further comprising:

two arms connecting the truck to the two telescopic legs.

17. The system of claim 16, wherein the two arms are telescopic.

18. The system of claim 12, wherein the two telescopic legs are provided on sides of the truck.

19. The system of claim 18, wherein the two telescopic legs are configured to swing in a horizontal plane relative to the truck.

20. A method for positioning a vehicle with a vibratory source and for generating seismic waves, the method comprising:

parking the vehicle at a desired location;

lowering a vibratory source to contact the ground and to lift off the ground wheels proximate to the vibratory source;

lowering telescopic legs to lift off the ground wheels proximate to the telescopic legs and to distribute more weight on the vibratory source; and actuating the vibratory source to generate the seismic waves into the ground.

* * * * *